Oct. 30, 1962     O. W. BOUGHTON ET AL     3,060,801
STEREOMICROSCOPE VARIABLE FOCUS MOUNTING
Original Filed April 21, 1958

OLIN W. BOUGHTON
KENNETH D. MAIER
INVENTORS

Oct. 30, 1962  O. W. BOUGHTON ET AL  3,060,801
STEREOMICROSCOPE VARIABLE FOCUS MOUNTING
Original Filed April 21, 1958  3 Sheets-Sheet 2
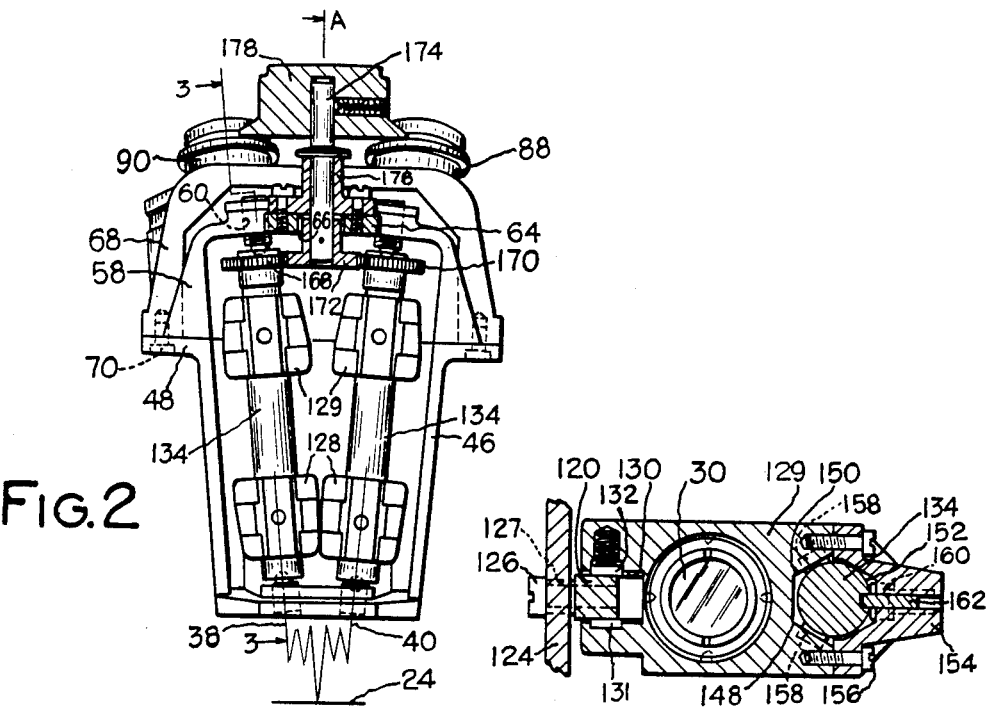
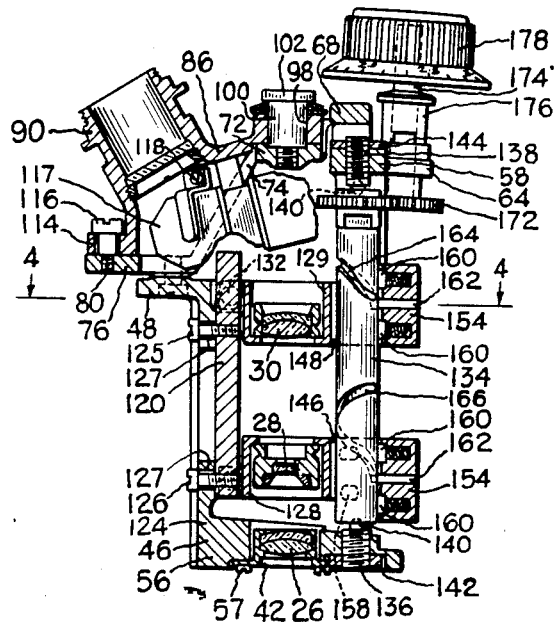
OLIN W. BOUGHTON
KENNETH D. MAIER
INVENTORS
BY Frank C. Parker
ATTORNEY

OLIN W. BOUGHTON
KENNETH D. MAIER
INVENTORS

BY Frank C. Parker
ATTORNEY

United States Patent Office 3,060,801
Patented Oct. 30, 1962

3,060,801
STEREOMICROSCOPE VARIABLE FOCUS MOUNTING
Olin W. Boughton, Canandaigua, and Kenneth D. Maier, Mendon, N.Y., assignors to Bausch & Lomb Incorporated, a corporation of New York
Original application Apr. 21, 1958, Ser. No. 729,782, now Patent No. 2,942,519, dated June 28, 1960. Divided and this application Oct. 5, 1959, Ser. No. 848,487
4 Claims. (Cl. 88—39)

This invention relates to microscopes and more particularly to a casing and mounting structure for a stereoscopic binocular microscope having means for continuously varying the magnification of the optical elements housed therein. The present invention is particularly adapted for housing and mounting the stereomicroscope lens system disclosed and claimed in the copending application Serial No. 729,800, filed April 21, 1958 and assigned to the same assignee, now abandoned. This application is a division of our copending application Serial No. 729,782, filed April 21, 1958, now Patent No. 2,942,519 issued June 28, 1960.

The principal object of the present invention is to provide an improved stereomicroscope casing and mounting structure which is adapted to house a continuously variable magnification objective lens system whereby the objective lens elements may be easily and accurately moved within their limits. Another object of this invention is to provide an improved mounting for the objective lens elements such that they may be moved in synchronism along prescribed paths.

Another object of the invention is to provide a mounting structure for the binocular mirror arrangement and the objective lens system of the type that provides for continuous variable magnification which will permit unit assembling of the microscope components and easy removal or adjustments of the individual components of the subassemblies.

Other objects and advantages will become apparent from the following description taken in conjunction with the drawing, wherein:

FIG. 2 is a vertical sectional view through the mirror and objective housings of the present invention;

FIG. 3 is a sectional view taken on the line 3—3 of FIG. 2;

FIG. 4 is a sectional view taken on the line 4—4 of FIG. 3; and

Figure 1:
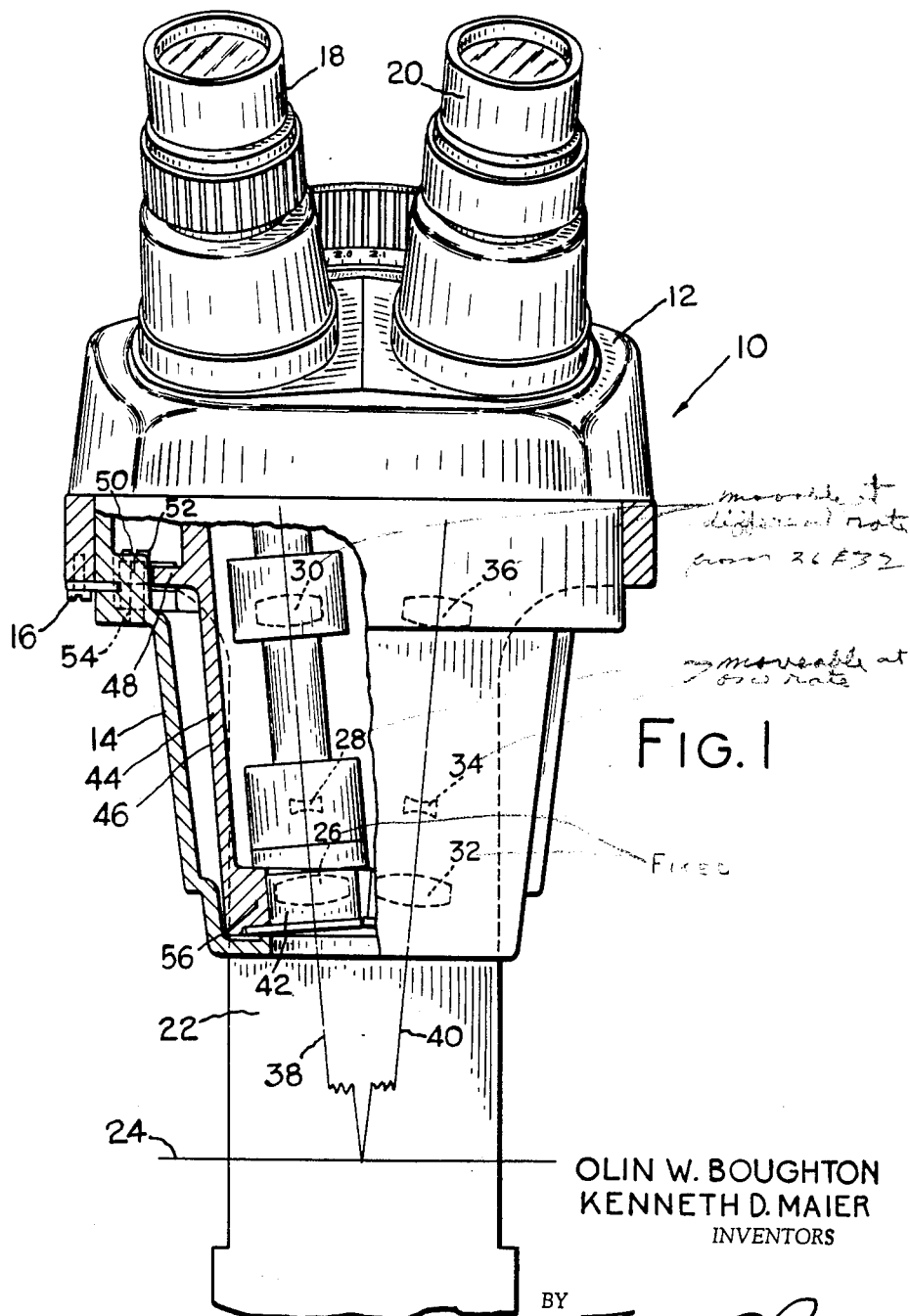
FIG. 1 is an elevational view, partly in section, of a stereomicroscope embodying the principles of the present invention.

Referring now to the drawings and particularly to FIG. 1, there is shown a binocular stereomicroscope body or head 10 comprising a mirror casing 12 having its lower side open and exposed to the open upper side of an objective casing 14 detachably mounted thereto in telescoping fashion by means of bolts 16. Mounted on top of the mirror casing is an ocular system comprising binocular eyepieces 18, 20 either of which may be individually adjustable both for focus and interpupillary distance. The head 10 is adjustably secured to a stand 22, by a suitable adjustment means (not shown) for vertical movements to facilitate the positioning of the optical system with reference to an object plane 24. A conventional base and substage may be incorporated into the illustrated microscope and since these parts do not form a part of the present invention, further description thereof is unnecessary.

The objective lens system includes two sets of lens elements, each set comprising elements 26, 28, 30 and 32, 34, 36, respectively, and having corresponding optical axes 38, 40 which are inclined with one another so as to converge at a point on the object plane 24. The characteristics and properties of the lens elements 26, 28, 30 and 32, 34, 36 form no part of the present invention as these are disclosed and claimed in the above-referred to copending application. However, the various functions and positionings of the objective lens elements which are identical to that disclosed in the said applications will be discussed briefly in order to point out the various novel features of the present invention.

The lens elements 26 and 32 are held stationary with respect to the object plane 24 and as shown in FIGS. 1 and 3 are suitably encased in sleeves 42, only one of which is shown mounted at the lower end of a housing 44. The lens elements 28, 30 and 34, 36 are slidably mounted within the housing 44 wherein elements 28 and 34 are movable in unison at one rate of non-linear movement and elements 30 and 36 are movable at another rate of non-linear movement along the optical axes 38 and 40, respectively, as will be presently described.

The housing 44 is in the form of a box-like structure having a slightly tapering body 46 and an outwardly extending flange 48 along the top edge thereof. This flange is formed with openings 50 for allowing the passage of a plurality of screws 52 therethrough which are adapted to be received in corresponding tapped bores formed on support shoulders 54 of the objective casing 14. In this manner, the housing 44 may be easily removed from the the microscope body 10 by first detaching the mirror casing 12 from the body in order to expose the interior of the objective housing, and then removing the screws 52 so that the housing 44 may be easily lifted from its support position on the shoulders 54.

Figure 5:
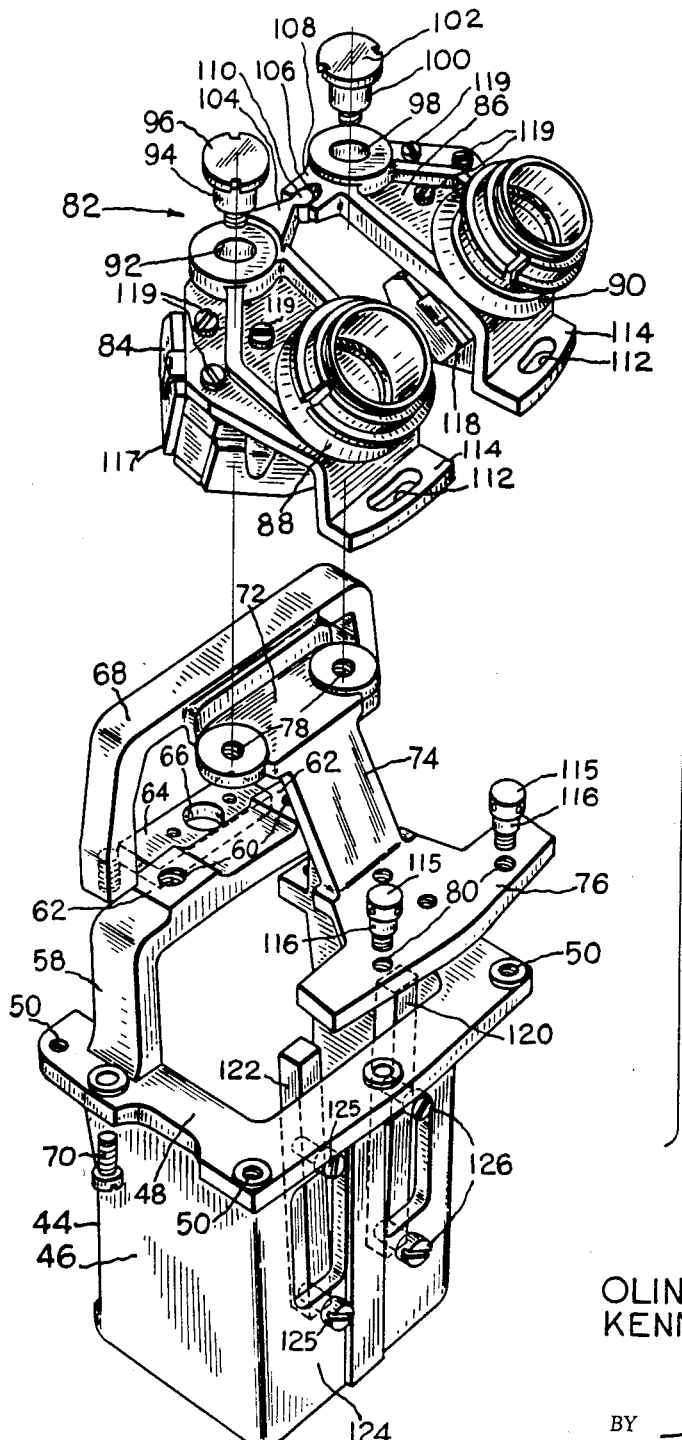
FIG. 5 is a blow-up of the casing and mounting structure for the mirror and objective lens system.

The bottom wall 56 of the housing 44 is opened to permit the mounting of the sleeves 42 by a plurality of bolts 57 for the lens elements 26 and 32. As shown in FIGS. 3 and 5, the housing 44 is fully open at the top in the plane of the flange 48 and at one side. A stirrup or yoke 58 formed integral with the housing 44 rises above the same and spans across the top thereof. A pair of bores 60 are tapped in flat bosses 62 on the yoke and are spaced equally on either side of the center plane A of the housing (see FIG. 2). An extension plate 64 integral with the yoke 58 has a large aperture 66 formed therein with the center thereof in line with the center plane A of the housing 44 and equidistant from the centers of the bores 60. Another stirrup or yoke 68, mounted on the flange 48 by screws 70, also rises above the housing and bridges across the open top thereof slightly higher than the yoke 58 and approximately in the vertical plane thereof.

The yoke 68 has an extension plate 72 integral therewith and extending in a direction opposite to that of the plate 64. Angularly depending from the plate 72 is a projection 74 which supports a flat plate 76 having a top surface parallel to the top surface of the plate 72, but spaced therefrom. A pair of tapped bores 78 are formed in the plate 72, equidistant from the transverse center line thereof and a pair of tapped bores 80 are formed in the plate 76, also at points equidistant from the transverse center line of the plate 76.

The yoke 68 and the plates 72, 76 serve as a support for a mirror and eyepiece mounting frame indicated generally by the reference numeral 82. The mounting frame 82 comprises two similar brackets 84, 86 each of which is formed with an eyepiece mounting nipple 88, 90, respectively, which support the eyepieces 18, 20. Means are provided for pivotally mounting each of the brackets 84, 86 upon the plate 72 and to this end, an opening 92 is formed on the bracket 84 for receiving a pivot pin 94 which is in threaded engagement with one of the bores 78 on the plate 72. A head 96 on the other end of the pin 94 serves to prevent lifting of the bracket when the pin 94 is locked to the plate 72. Similarly, the bracket 86 is formed with an opening 98 for receiving a pivot pin 100 which is in threaded engagement with the other bore 78. A head 102 on the pin 100 retains the bracket 86 upon the plate 72. The clearance between the heads 96 and 102 and their respective brackets is such as to permit easy pivotal movement of the brackets.

In order to insure equal pivotal movement of the brackets 84, 86, a simple linkage is provided therebetween for imparting any motion of one bracket to the other. The linkage comprises a rocking lever 104 formed integral with the bracket 84 and a notch 106 formed in an extension 108 of the bracket 86. A circular bearing tip 110 at the extreme end of the lever 104 is retained within the notch 106 and is adapted to ride along the edges thereof upon rocking movement of the brackets 84, 86 about their respective pivots 94, 100. Pivotal movement of the brackets serves to vary the distance between the centers of the eyepiece nipples 88, 90 and consequently the distances between the optical axes of the eyepieces 18, 20 thereby providing a simple means for adjusting or presetting these distances. In order to maintain the nipples 88, 90 and consequently the brackets in any desired position to which they have been moved, a pair of slots 112, one formed on an extension 114 on each of the brackets 84, 86, is provided. These slots have extending therethrough bearing screws 115 which are in threaded engagement with the bores 80 in the plate 76 and are formed with bearing surfaces 116 which engage the edges of the slots and thereby releasably hold the extensions 114 in place. The extensions 114 are adapted to slide on the plate 76 during pivotal movement of the brackets 84, 86 and may be maintained in any desired position by the engagement of the surfaces 116 with the edges of the slots 115 when a proper distance between the eyepiece nipples 88, 90 has been obtained. In actual practice, movement of the eyepieces 18, 20 will effect the movement of the nipples 88, 90 and the brackets without necessitating removal of the casing 12 from the microscope body 10.

Each of the brackets supports a mirror arrangement, indicated generally at 117, for transmitting the image of an object to the respective eyepiece. Instead of mirrors, prisms may be utilized to effect the same purpose. Since these reflective arrangements are well known in the art, it will be unnecessary to describe the details and operation thereof. The mirror arrangements serve to fold the image forming rays emanating from the object plane 24 and direct the same along the optical axes of the eyepieces 18, 20 and since these mirror arrangements are movable with the brackets 84, 86, the image rays will be so directed for any position of the eyepiece nipples 88, 90 within their limits of movement as defined by the length of the slots 112. It will be obvious that the mirror arrangements 117, the brackets 84, 86 and the structure supported thereby are contained in the mirror casing 12, so that upon removal of the casing, the above structure will be exposed for easy removal, adjustment or the replacement of parts. To detach the brackets 84, 86 from the plates 72 and 76, which support the same, merely requires the removal of the screws 96, 102 and 116. A plurality of screws 118 serve to suitably attach the individual mirrors of the mirror arrangements 117 to the corresponding bracket, and screws 119 are utilized to adjust the angularity of the mirrors in order to insure alignment of the optical axes of the arrangements. The details and operation of the adjusting means (not shown) are well known in the art and need not be described here.

Within the housing 46 two guide rails 120, 122 are mounted adjacent a wall 124 thereof and are inclined with one another at an angle equal to the angle between the optical axes 38, 40. As shown in FIG. 2, the longitudinal axis of the rail 120 is parallel to the optical axis 38, and the longitudinal axis of the rail 122 is parallel to the optical axis 40. Each of the rails is adjustably secured to the wall 124 by a pair of screws 125, 126, respectively, which project through suitable apertures 127 in the wall. It will be noted, see FIG. 3, that the apertures 127 have a diameter slightly larger than the diameters of the screw thus permitting slight lateral adjustment of the screws before they are fastened. In this manner, the rails 120, 122 may be adjusted along their respective axes and to either side thereof in order to adjust the alignment and the parallelism of the guide rails with the optical axes 38, 40.

Each of the rails 120, 122 serves as a guide for a pair of lens holders to be described hereinafter, and, since both pairs of lens holders and the corresponding driving means are identical, only one set of these elements will be described in detail. In FIG. 3, the rail 120 is shown having associated therewith a lower lens holder 128 which carries the lens element 28 and an upper lens holder 129 which carries the lens element 30. As previously mentioned, the lens elements 26, 28 and 30 are in axial alignment and along their optical axis, the lens elements 28, 30 are arranged to be moved relative to one another and to the fixed element 26. The end of each of the lens holders adjacent the rail 120 is formed with a generally rectangular notch 130 having a width slightly larger than the width of the rail for permitting the rail to freely slide therethrough. A bearing block 131 is fixed at one side of the notch 130 and a spring biased block 132 is provided at the other side thereof for insuring a relatively firm engagement of these blocks upon the rail. The spring force exerted upon the rail is such that the lens holder will always travel in a straight line and in a predetermined path along the optical axis 38 without undue friction placed upon the lens holder.

Such movement of the lens holders 128, 129 is accomplished by means of a rotatable cam cylinder 134 which has its longitudinal axis parallel to the optical axis 38. The cam cylinder is mounted at its ends within the housing 44 by means of adjusting screws 136, 138 and a ball bearing 140 positioned in suitable recesses formed in each end of the cylinder and the adjacent end of the corresponding adjusting screws. The adjusting screw 136 is aligned axially with the cam cylinder 134 and is adjustably retained in the end wall 56 of the housing 44. A lock nut 142 on the screw 136 serves to lock the same with respect to the end wall when the cam cylinder is initially located in a predetermined position. At the other end of the cam cylinder, the adjusting screw 138 is aligned with the axis of the cam cylinder and is retained in the tapped bore 60 formed in the yoke 58. A lock nut 144 on the screw 138 serves to lock the same against movement when the cam cylinder is in its desired position. Actually, both screws 136, 138 are utilized in order to position the cam cylinder or to adjust the same in the event such action is required. The ball bearings 140 serve to permit easy rotation of the cam cylinder during actuation thereof.

The lens holders 128, 129 are formed with coaxial openings 146, 148, respectively, which are adapted to slidably and rotatably receive the cam cylinder 134. In FIG. 4, the opening 146, which has the same configuration as the opening 148, is shown as being defined by two facing cutouts 150, 152, one of which is formed in the lens holder and the other in an end block or cap 154 suitably attached to the holder by bolts 156. The cutout 150 has three sides, with each of the two extreme sides having a pair of upper and lower bearing blocks 158 for engaging the cylinder 134, see FIG. 3. The other cutout 152 has three sides, of which the middle side is provided with a pair of upper and lower spring biased bearing blocks 160 in spaced alignment and also contacting the cylinder 134. Thus, the lens holders are held against lateral movement relative to the cylinder by a six bearing contact arrangement associated with each of the lens holders. The bias on the block 160 is such as to allow rotation of the cylinder and sliding of the lens holders without undue friction between all of the bearing blocks and the surface of the cylinder while at the same time restricting movement of the lens holders along the axis of the cylinder when the same is not rotating. The provision of a removable end block 154 permits easy removal or adjustment of the cylinder without affecting the lens holders 128, 129.

In order to impart movement to the lens holders 128, 129 along the optical axis 38 of the lens elements 28, 30, each of the lens holders is provided with a cam follower 162 which is secured to the end block 154 between the bearing blocks 160 and projects into the respective cylinder receiving opening 150 or 152. The follower 162 associated with the lens holder 128 cooperates with the edges of a non-linear helical cam groove 164 formed in the cylinder 134 and the follower associated with the lens holder 129 similarly cooperates with the edges of another non-linear helical cam groove 166 formed in another part of the cylinder. As shown in FIG. 3, the grooves 164, 166 have different pitch angles thus causing movement of the lens holders at different rates of speed upon rotation of the cylinder.

The grooves are not continuous and are formed for approximately 340° of the periphery of the cylinder with the ends of each of the grooves lying in a line parallel with the axis of the cylinder. Thus, both cam followers will reach the terminal points of their respective grooves simultaneously. The graphic or curvature characteristics of the grooves 164, 166 are disclosed in the above-referred to application and these are such as to drive each of the lens elements 28, 30 at a predetermined rate in order to locate the same at predetermined positions with respect to each other and the fixed lens element 26. The helix angles of the grooves and the characteristics of the lens elements are such as to provide continuous variable magnification of an object to be viewed during rotation of the cylinder 134 without requiring refocusing of the other lens system of the microscope.

Means are provided for imparting smooth and slackless rotation of both cam cylinders 134 by a single operating knob and to this end a gear 168, 170 is coaxially arranged at one end of each of the cylinders. Cooperating with the gears 168, 170 is a drive gear 172 arranged therebetween and in mesh therewith. The drive gear 172 is driven by a shaft 174 which is supported by a fitting 176 suitably bolted to the plate 64 of the yoke 58. As shown in FIG. 2, the shaft extends through the opening 66 of the plate 64 and has mounted on the end remote from the drive gear 172 a manually actuated knob 178. Rotation of this knob will rotate the drive gear which will impart simultaneous rotation of the cylinders 134 in opposite directions. The curves 164 on each of the cylinders are identical but are arranged oppositely thereon in order to impart simultaneous movement of the lens holders 129 in the same direction. Similarly, the curves 166 on the cylinder are identical and are arranged oppositely for the same purpose.

From the foregoing description, it will be appreciated that a novel mounting structure is provided for an objective lens system of the continuously variable magnification type. This mounting structure is in the form of three basic elements, namely, the housing 44, the intermediate yoke 68 and the mirror mounting frame means 82. Various components of the microscope are mounted in or upon these basic elements which are readily assembled or disassembled from each other. The components of the microscope associated with a particular basic element are themselves readily accessible for mounting, removal or adjustment. Such an arrangement allows for unit replacement or assembly of subassemblies without requiring dismantling of the other non-affected components of the microscope.

The mounting structure also facilitates the adjustments of some of the microscope components without undue dismantling of other components such as, for example, the individual mirrors of the mirror assembly 117. It will be appreciated that these mirrors are mounted on a frame which itself may be separated intact from the microscope casing thus eliminating the usual practice of removing the mirror from the casing itself. Once out of the casing, the mirror mounting frame may be used for inspecting the alignment of the mirrors and any necessary adjustments may be made while the mirrors are attached to the frame.

The movable objective lens elements 28, 30, 34, 36 may be easily adjusted without their removal from their mounting structure, for example, by the provision of the guide rail adjusting screws 126, 127 or by the adjustment screws 136, 138 for the cam cylinders 134. The lens holders may be removed in the event other lens elements having different powers are to be utilized. In this event, other cam cylinders may be easily incorporated for the new lens elements thereby modifying the variable magnification range.

It will also be appreciated that the removable basic elements may be removed intact from the microscope casing for inspection, cleaning and lubricating purposes. Every element and component in the apparatus is then exposed for these purposes without affecting the positioning of these structures.

We claim:
1. In a mounting mechanism for a stereo pair of microscope objectives of the continuously variable magnification type wherein each objective consists of a stationary lens and two varifocal lenses which are optically aligned with said stationary lens and are moved axially with respect thereto to vary the magnification of the image of a specimen,
   the combination of a box-like open-sided and unitary self-rigid housing which is open at one end, an end wall wherein said stationary lens is held, said wall being formed in the housing opposite to the open end thereof and a back wall formed opposite to the open side, an arch-like yoke formed across said open end and joining the sides of said housing,
   a pair of drivingly interconnected cam cylinders which are rotatably mounted for like rotation at one end thereof in said yoke and at the other end thereof in said end wall in converging relation to each other so their respective axes meet at a stationary point in the plane of said specimen, said cylinders each having cam means formed thereon and operatively connected for moving said varifocal lenses along said cylinders in a rectilinear path,
   two movable lens holders wherein said two varifocal lenses are held, said holders having an end portion freely encircling one of said cam cylinders for movement axially thereof,
   bearing means carried by said holders and operatively located between said cylinders and said end portion of the holders so as to slidingly engage said cylinders and support the lens holders normal to said cylinders,
   a pair of guide rails fixed to said back wall and having the same mutually converging relation of their longitudinal axes as the aforesaid axes of the cam cylinders and each rail extending parallel to one of said cylinders and spaced therefrom and in cooperation with said cylinders acting to establish said path of rectilinear motion of said lens holders which is coincident with the axis of said stationary lens, and
   a pair of parallel bearing surfaces carried by the end of the lens holders which is adjacent to said rails, said surfaces being slidably fitted against and em- bracing two opposite surfaces of the rail, said varifocal lenses being thereby positioned between the rails and the cylinders whereby angular movement of the lens holders about the cylinder axes is prevented and true rectilinear movement of said varifocal lenses in coincidence with the optical axis of said stationary lens in all focal positions thereof is provided.

2. A mounting mechanism for a stereo pair of microscope objectives as set forth in claim 1 wherein said bearing means comprises two axially aligned tandem sets of three circumferentially equally spaced bearing blocks which are seated in each said lens holder around one of said cylinders and bear radially thereon, one tandem pair of said bearing blocks being resiliently mounted in axially spaced relation to each other at an angular position which is substantially 180° away from said lenses and the other two bearing blocks of each set being fixedly mounted whereby the lens holder is yieldingly maintained in a position normal to the axes of said cylinders.

3. A mounting mechanism for a stereo pair of microscope objectives as set forth in claim 2, said combination further including two helix-like cam grooves formed in axially spaced relation in each of said cylinders, a cam follower engaging each of said grooves and seated in the respective lens holders substantially midway between the aforesaid pair of resiliently mounted bearing blocks and in alignment therewith whereby tilting of the holders out of normal position during travel in either direction is minimized.

4. A mounting mechanism for a stereo pair of microscope objectives as set forth in claim 3, said combination further including a pivot member operatively engaged at each end of all of said cam cylinders to rotatably mount said cylinders, each said member being coaxially aligned with said cylinders and being axially adjustably held in said housing for changing axial position of one of said cylinders relative to the other.

References Cited in the file of this patent

UNITED STATES PATENTS

| | | |
|---|---|---|
| 1,167,425 | Ott | Jan. 11, 1916 |
| 2,093,605 | Gallasch et al. | Sept. 21, 1937 |
| 2,165,341 | Capstaff et al. | July 11, 1939 |
| 2,791,937 | Leitz et al. | May 14, 1957 |

FOREIGN PATENTS

| | | |
|---|---|---|
| 99,849 | Germany | Nov. 3, 1898 |